United States Patent Office 3,206,474
Patented Sept. 14, 1965

3,206,474
ACETAL AND KETAL PHOSPHONATES
Ingenuin Hechenbleikner and Kenneth R. Molt, Cincinnati, Ohio, assignors to Carlisle Chemical Works, Inc., Reading, Ohio, a corporation of Ohio
No Drawing. Filed Dec. 20, 1962, Ser. No. 245,976
7 Claims. (Cl. 260—340.7)

This application is a continuation-in-part of application 214,508, filed August 3, 1962, now U.S. Patent No. 3,096,345.

The present invention relates to novel phosphonates.

It is an object of the present invention to prepare phosphonates of polyhydric alcohols having at least three hydroxyl groups.

Another object is to prepare novel heterocyclic acetal and ketal phosphonates.

A further object is to prepare novel phosphonates by the hydrolysis of acetal and ketal phosphonates.

A still further object is to prepare novel open chain acetal and ketal phosphonates.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by preparing novel acetals and ketals having one of the formulae

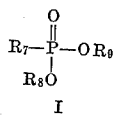

I where $R_7$ is alkyl, alkenyl, aralkyl or $R_9$, $R_8$ is alkyl, alkenyl, aralkyl, aryl, haloaryl or $R_9$ and $R_9$ is

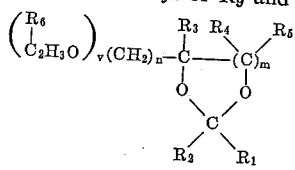

where $R_1$ is hydrogen alkyl, aryl, haloaryl or nitroaryl, $R_2$ is hydrogen, alkyl aryl, haloaryl or nitroaryl; or

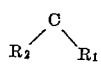

is an alicyclic, i.e., a cycloalkyl group, $R_3$ is hydrogen, alkyl or aryl, $R_4$ is hydrogen or alkyl, $R_5$ is hydrogen or alkyl, $R_6$ is hydrogen, or lower alkyl, e.g., methyl or ethyl, $v$ is 0 or an integer, e.g., from 1 to 100, $n$ is an integer between 1 and 10, $m$ is 1 or 2;

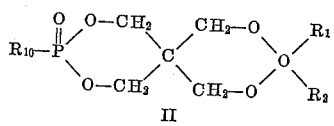

II where $R_{10}$ is alkyl, alkenyl or aralkyl and $R_1$ and $R_2$ are as defined above

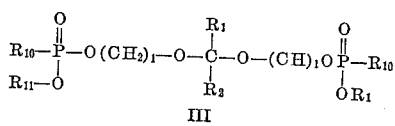

III where $R_{11}$ is alkyl, alkenyl aryl, haloaryl or aralkyl and $R_1$, $R_2$, and $R_{10}$ are as defined above

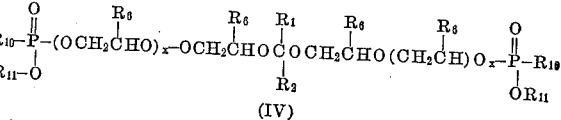

(IV)

where $R_1$, $R_2$, $R_6$, $R_{10}$, $R_{11}$ are as defined above and $x$ is an integer of at least 1, e.g., from 1 to 100.

There are also included phosphonates of diacetals and ketals or hexitols such as sorbitol and mannitol. Typical of such materials are compounds having the formula

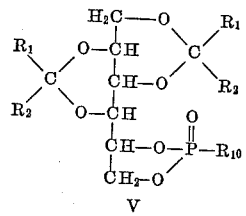

V where $R_1$, $R_2$ and $R_{10}$ are as defined above.

In Formula V no attempt has been made to show the position of the hydrogen atoms on the asymmetric carbon atoms. The position of the acetal and ketal groups also can be varied so long as there are two such groups in the molecule.

The compounds of the present invention are useful as water dispersible wetting and suspending agents. They can also be employed as fire retardants for cellulose, cellulose esters, e.g. cellulose acetate, polyolefin resins, e.g. polyethylene and polypropylene.

A particular important use for the acetals and ketals of the present invention is to hydrolyze them to give hydroxyl containing phosphonates. Such hydroxyl containing phosphonates have the following formulae

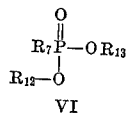

VI where $R_7$ is as defined above, $R_{12}$ is alkyl, alkenyl, aralkyl, aryl, haloaryl or $R_{13}$ and $R_{13}$ as

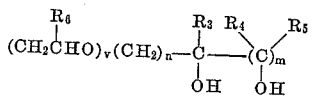

where $R_3$, $R_4$, $R_5$, $R_6$, $v$, $n$ and $m$ are as defined above;

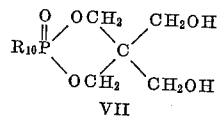

VII where $R_{10}$ is as defined above;

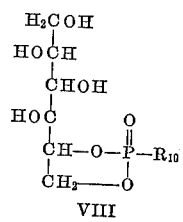

VIII where $R_{10}$ is as defined above.

The hydrolyzed phosphonates, i.e. the compounds of Formulae VI, VII, and VIII, have the uses set forth supra and in addition are useful for preparing polyurethanes by reaction with organic isocyanates, e.g. toluene diisocyanate and PAPI (polyphenylene isocyanate averaging about 3 units in the polymer). The polyurethanes can be prepared as foams or as elastomers. The presence of the phosphonate group renders the polyurethane flame resistant. The phosphonate need by used only as a portion of the polyols employed. Thus, the use of 20% of a polyhydroxyl containing phosphonate according to the present and 80% of another polyol, e.g. glycerine propylene oxide adduct molecular weight 3000 or polypropylene glycol 2025 will give a polyurethane with improved flame resistance.

The novel compounds of Formulae I through V of the present invention are prepared by Arbuzov rearrangement of the corresponding phosphite prepared according to the parent application. The entire disclosure of the parent application is hereby incorporated by reference.

Thus, there is employed an alkyl halide, alkenyl halide, aralkyl halide, halohydrin or epihalohydrin with a phosphite of the parent application that is isomeric with a phosphonate of Formulae I through V above. The iodides and bromides are preferred although there can also be employed the chlorides. The halides can be employed in catalytic amounts, e.g. 0.5–5 mol percent based on the phosphite to be rearranged. If the hydrocarbon group of the halide is the same as one of the esterifying groups of the phosphite, then no impurities are introduced into the phosphonate product. By employing a large amount of the halide, e.g. 80 mol percent, or preferably 100 mol percent or more, based on the phosphite employed in the Arbuzov reaction, then the product is one in which one of the esterifying groups on the phosphorus atom is removed and the phosphorus atom is directly attached to the hydrocarbon, hydroxyhydrocarbon or epoxyhydrocarbon group of the halide employed. When one of the sterifying groups of the phosphite is aryl or haloaryl, sufficient alkyl halide or the like must be used to replace the aryl or haloaryl group since aryl halides do not normally take part in the Arbuzov reaction. The Arbuzov reaction is usually carried out at elevated temperatures, e.g. 120–200° C. at atmospheric, subatmospheric or superatmospheric pressure. The halide remaining after the reaction can normally be removed by distillation.

Among the halides which are employed in the Arbuzov reaction are methyl bromide, methyl iodide, ethyl bromide, ethyl iodide, n-propyl iodide, isopropyl iodide, amyl bromide, amyl chloride, amyl iodide, butyl bromide, hexyl iodide, octyl bromide, octyl iodide, decyl bromide, decyl iodide, dodecyl iodide, octadecyl bromide, octadecyl iodide, allyl bromide, allyl iodide, allyl chloride, methallyl iodide, crotyl bromide, vinyl bromide, oleyl bromide, oleyl iodide, benzyl chloride, benzyl bromide, benzyl iodide, o-dodecylbenzyl chloride, p - dodecylbenzyl chloride, m-dodecylbenzyl chloride p - dodecylbenzyl bromide, epichlorhydrin, epibromohydrin, epiiodohydrin, ethylene chlorhydrin, ethylene bromohydrin, ethylene iodohydrin, propylene chlorhydrin, propylene bromohydrin.

The compounds of Formulae VI through VIII are prepared by hydrolysis of the compounds of Formulae I, II, and V. The hydrolysis is caried out with the aid of water, preferably with heating, e.g. up to 100° C. The reaction mixture is usually slightly acidic due to the starting phosphonate. After hydrolysis is completed, an alkaline material, e.g. sodium hydroxide, sodium carbonate, sodium bicarbonate or potassium hydroxide is added to neutralize the product.

Illustrative examples of starting phosphites (which can be prepared in the manner set forth in the parent application) to prepare the phosphonates of Formula I are phenyl bis(4-(2-methyl-2-ethyl-1,3-dioxacyclopentyl) methyl) phosphite diphenyl-4-(2-methyl-2-ethyl-1,3-dioxacyclopentyl) methyl phosphite;
methyl bis (4-(2-methyl-2-ethyl-1,3-dioxacyclopentyl)-methyl) phosphite;
dimethyl 4-(2-methyl-2-ethyl-1,3-dioxacyclopentyl) methyl phosphite;
ethyl bis(4-(2-methyl-2-ethyl-1,3-dioxacyclopentyl)-methyl) phosphite, tris(4-(2-methyl-2-ethyl-1,3-dioxacyclopentyl) methyl) phosphite;
decyl bis(4-(2-methyl-2-ethyl-1,3-dioxacyclopentyl) methyl) phosphite; octadecyl bis(4-(2-methyl-2-ethyl-1,3-dioxacyclopentyl) methyl) phosphite;
dioctadecyl 4-(2-methyl-2-ethyl-1,3-dioxacyclopentyl) methyl phosphite;
oleyl bis (4(2-methyl-2-ethyl-1,3-dioxacyclopentyl) methyl) phosphite;
benzyl-bis (4-(2-methyl-2-ethyl-1,3-dioxacyclopentyl) methyl) phosphite;
p-dodecylbenzyl-bis (4-(2-methyl-2-ethyl-1,3-dioxacyclopentyl) methyl) phosphite;
cyclohexyl-bis-(4-(2-methyl-2-ethyl-1,3-dioxacyclopentyl) methyl) phosphite;
tris (5-(2,5-dimethyl-2-ethyl-1,3-dioxacyclohexyl) methyl) phosphite;
ethyl bis(5-(2,5-dimethyl-2-ethyl-1,3-dioxacyclohexyl) methyl) phosphite;
dimethyl-5-(2,5-dimethyl-2-ethyl-1,3-dioxacyclohexyl) methyl phosphite;
lauryl bis-(5-(2,5-dimethyl-2-ethyl-1,3-dioxacyclohexyl) methyl) phosphite;
allyl bis(5-(2,5-dimethyl-2-ethyl-1,3-dioxacyclohexyl) methyl) phosphite;
cyclopentyl-bis (5(2,5-dimethyl-2-ethyl-1,3-dioxacyclohexyl)methyl) phosphite;
dibutyl-5-(2,2,5-trimethyl-1,3-dioxacyclohexyl)methyl phosphite;
butyl bis(5-(2,2,5-trimethyl-1,3-dioxacyclohexyl) methyl) phosphite;
tris(5-(2,2,5-trimethyl-1,3-dioxacyclohexyl)methyl) phosphite;
propyl bis(5-(2,2,5-trimethyl-1,3-dioxacyclohexyl) methyl) phosphite;
tris(4-(2,2-dimethyl-1,3-dioxacyclopentyl)methyl) phosphite;
methyl bis(4-(2,2-dimethyl-1,3-dioxacyclopentyl) methyl) phosphite;
octadecyl bis(4-(2,2-dimethyl-1,3-dioxacyclopentyl) methyl) phosphite;
isobutyl bis(4-(2,2-dimethyl-1,3-dioxacyclopentyl) methyl) phosphite;
ethyl bis(4-(1,3-dioxacyclopentyl)methyl) phosphite;
tris(4-(1,3-dioxacyclopentyl)methyl) phosphite;
dioctadecyl (4-(1,3-dioxacyclopentyl)methyl) phosphite;
tris(4-(2-methyl-1,3-dioxacyclopentyl)methyl) phosphite;
ethyl bis(4-(2-methyl-1,3-dioxacyclopentyl)methyl) phosphite;
tris(4-(2-ethyl-1,3-dioxacyclopentyl)methyl) phosphite;
methyl bis(4-(2-ethyl-1,3-dioxacyclopentyl)methyl) phosphite;
dioleyl 4-(2-ethyl-1,3-dioxacyclopentyl) methyl phosphite;
tris(4-(2-propyl-1,3-dioxacyclopentyl)methyl) phosphite;
benzyl bis(4-(2-propyl-1,3-dioxacyclopentyl)methyl) phosphite;
decyl bis(4-(2-propyl-1,3-dioxacyclopentyl)methyl) phosphite;
ethyl bis(4-(2-heptadecyl-1,3-dioxacyclopentyl)methyl) phosphite;
methyl bis(4-(2-heptadecenyl-1,3-dioxacyclopentyl) methyl) phosphite;
tris(4-(2-vinyl-1,3-dioxacyclopentyl)methyl) phosphite;
amyl bis(4-(2-vinyl-1,3-dioxacyclopentyl)methyl) phosphite;
dodecyl bis(4-(2-phenyl-1,3-dioxacyclopentyl)methyl) phosphite;
octyl bis(4-(2-p-methylphenyl-1,3-dioxacyclopentyl) methyl) phosphite;
octadecyl bis(4-(2-o-chlorophenyl-1,3-dioxacyclopentyl) methyl) phosphite;

ethyl bis(4-(2-m-nitrophenyl-1,3-dioxacyclopentyl) methyl) phosphite;
tris(4-(2-bromophenyl-1,3-dioxacyclopentyl)methyl) phosphite;
tris[4-(2-methyl-2-propyl-1,3-dioxacyclopentyl]methyl) phosphite;
decyl bis(4-(2-methyl-2-propyl-1,3-dioxacyclopentyl) methyl) phosphite;
tris(4-(2,2-diethyl-1,3-dioxacyclopentyl)methyl) phosphite;
diamyl 4(2,2-diethyl-1,3-dioxacyclopentyl)methyl phosphite;
methyl bis(4-(2-methyl-2-butyl-1,3-dioxacyclopentyl) methyl) phosphite;
tris(4-(2-ethyl-2-propyl-1,3-dioxacyclopentyl) methyl phosphite;
methyl bis(4-(2-ethyl-2-propyl-1,3-dioxacyclopentyl) methyl) phosphite;
ethyl bis(4-2,2-dipropyl-1,3-dioxacyclopentyl)methyl) phosphite;
tris(4-(2,2-diheptadecyl-1,3-dioxacyclopentyl)methyl) phosphite;
butyl bis(4-(2,2-diheptadecyl-1,3-dioxacyclopentyl) methyl) phosphite;
tris(3(1,4-dioxaspiro (5,5) decyl)methyl) phosphite;
butyl bis(3(1,4-dioxaspiro (5,5) decyl)methyl) phosphite;
methyl bis(3(1,4-dioxaspiro (5,5) nonyl)methyl) phosphite;
tris(4(2,2-diphenyl-1,3-dioxacyclopentyl)methyl) phosphite;
octyl bis(4-(2,2-diphenyl-1,3-dioxacyclopentyl)methyl) phosphite;
tris(4-(2-methyl-2-phenyl-1,3-dioxacyclopentyl)methyl) phosphite;
methyl bis(4-(2-methyl-2-phenyl-1,3-dioxacyclopentyl) methyl) phosphite;
ethyl bis(4-(2,2-dimethyl-1,3-dioxacyclopentyl) propoxymethyl) phosphite;
methyl bis(4(2-methyl-2-ethyl-1,3-dioxacyclopentyl) polyethoxy methyl) phosphite where the polyethoxy radical contains 30 ethoxy groups;
tris(4(2,2-dimethyl-1,3-dioxacyclopentyl)butyl) phosphite;
decyl bis(4-(2,2-dimethyl-1,3-dioxacyclopentyl)butyl) phosphite;
diethyl 4-(1,3-dioxacyclopentyl)butyl phosphite;
methyl bis(4(2-methyl-1,3-dioxacyclopentyl)butyl) phosphite;
hexyl bis(4(2-methyl-2-ethyl-1,3-dioxacyclopentyl) butyl) phosphite;
tris(4-1,3-dioxacyclopentyl)butyl) phosphite;
methyl bis(4(1,3-dioxacyclopentyl butyl) phosphite;
ethyl bis(4(2-methyl-1,3-dioxacyclopentyl)butyl) phosphite;
benzyl bis(4(2,2-dimethyl-1,3-dioxacyclopentyl)butyl phosphite;
heptyl bis(4(2,2-diphenyl-1,3-dioxacyclopentyl)butyl) phosphite;
tris(4(2,2,5-trimethyl-1,3-dioxacyclopentyl)methyl) phosphite;
propyl-bis(4(2,2,5-trimethyl-1,3-dioxacyclopentyl) methyl) phosphite;
butyl bis(4(2,2-dimethyl-5-ethyl-1,3-dioxacyclopentyl) methyl) phosphite;
methyl bis(4(2,4,5-trimethyl-2-ethyl-1,3-dioxacyclopentyl)methyl phosphite;
decyl bis(5(2,5-dimethyl-1,3-dioxacyclohexyl)methyl) phosphite;
butyl bis(5(2-methyl-2,5-diethyl-1,3-dioxacyclohexyl) methyl) phosphite;
diamyl-5(2-methyl-2,5-diethyl-1,3-dioxacyclohexyl) methyl phosphite;
ethyl bis(5(2,2-dimethyl-5-propyl-1,3-dioxacyclohexyl) methyl) phosphite;
allyl bis(5(2,2-dimethyl-5-heptadecyl-1,3-dioxacyclohexyl)methyl) phosphite;
tris(5(5-methyl-1,3-dioxacyclohexyl)methyl) phosphite;
cetyl bis(5(5-methyl-1,3-dioxacyclohexyl)methyl) phosphite;
tris(5(5-ethyl-1,3-dioxacyclohexyl)methyl) phosphite;
dodecyl bis(5(5-ethyl-1,3-dioxacyclohexyl)methyl) phosphite;
tris(5(2,5-dimethyl-1,3-dioxacyclohexyl)methyl) phosphite;
ethyl bis(5(2,5-dimethyl-1,3-dioxacyclohexyl)methyl) phosphite;
tris(5(2-methyl-5-ethyl-1,3-dioxacyclohexyl)methyl) phosphite;
ethyl bis(5(2-methyl-5-ethyl-1,3-dioxacyclohexyl) methyl) phosphite;
methyl bis(5(2-isobutyl-5-ethyl-1,3-dioxacyclohexyl) methyl) phosphite;
propyl bis(5-(2-phenyl-5-ethyl-1,3-dioxacyclohexyl) methyl) phosphite;
dimethyl-5(2,2-dimethyl-5-ethyl-1,3-dioxacyclohexyl) methyl phosphite;
tris(5(2,2,5-trimethyl-1,3-dioxacyclohexyl)methyl) phosphite;
propyl bis(5(2,2,5-trimethyl-1,3-dioxacyclohexyl) methyl) phosphite;
methyl bis(5(2-methyl-2-phenyl-5-ethyl-1,3-dioxacyclohexyl) methyl phosphite;
ethyl bis(5(2,5-dimethyl-2-phenyl-1,3-dioxacyclohexyl) methyl) phosphite;
tris(5(2,2-diethyl-5-methyl-1,3-dioxacyclohexyl)methyl) phosphite;
octadecyl bis(5(2,2-diethyl-5-methyl-1,3-dioxacyclohexyl) methyl) phosphite;
tris(3(3-methyl-1,5-dioxaspiro (6,6) undecyl)methyl) phosphite;
amyl bis(3(3-methyl-1,5-dioxaspiro (6,6) undecyl) methyl)phosphite;
tris(3(3-ethyl-1,5-dioxaspiro (6,6) undecyl)methyl) phosphite;
butyl bis(3(3-ethyl-1,5-dioxaspiro (6,6) undecyl)methyl) phosphite;
ethyl bis(5(2-cyclohexyl-5-methyl-1,3-dioxacyclohexyl) methyl) phosphite;
methyl bis(5(2,2-diamyl-5-ethyl-1,3-dioxacyclohexyl) methyl) phosphite;
methyl bis(5(2,2-dimethyl-5-phenyl-1,3-dioxacyclohexyl)methyl) phosphite.

Illustrative of phosphonates of the present invention within Formula I are phenyl(4-(2-methyl-2-ethyl-1,3-dioxacyclopentyl) methyl)methanephosphonate;
bis(4-(2-methyl-2-ethyl-1,3-dioxacyclopentyl)methyl) methanephosphonate;
bis(4-(2-methyl-2-ethyl-1,3-dioxacyclopentyl) methyl)-2-hydroxyethanephosphonate;
bis(4-(2-methyl-2-ethyl-1,3-dioxacyclopentyl) methyl)-2-hydroxypropanephosphonate;
bis(4-(2-methyl-2-ethyl-1,3-dioxacyclopentyl)methyl) epoxypropanephosphonate;
methyl (4-(2-methyl-2-ethyl-1,3-dioxacyclopentyl)methyl) methane phosphonate;
bis(4-(2-methyl-2-ethyl-1,3-dioxacyclopentyl)-methyl) ethane phosphonate;
bis(4-(2-methyl-2-ethyl-1,3-dioxacyclopentyl) methyl) 4-(2-methyl-2-ethyl-1,3-dioxacyclopentyl) methane phosphonate;
bis(4-(2-methyl-2-ethyl-1,3-dioxacyclopentyl) methyl) decane phosphonate;
bis(4-(2-methyl-2-ethyl-1,3-dioxacyclopentyl) methyl) octadecane phosphonate;

octadecyl 4-(2-methyl-2-ethyl-1,3-dioxacyclopentyl) methyl octadecane phosphonate

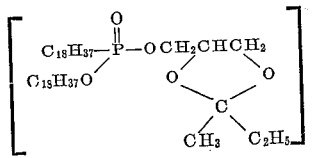

bis(4-(2-methyl-2-ethyl-1,3-dioxacyclopentyl) methyl Δ⁹-octadecene phosphonate;
bis(4-(2-methyl-2-ethyl-1,3-dioxacyclopentyl) methyl) phenylmethane phosphonate

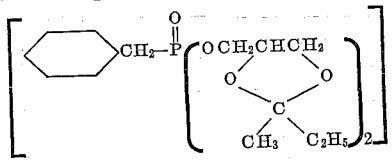

bis(4-(2-methyl-2-ethyl-1,3-dioxacyclopentyl) methyl) p-dodecylphenyl-methane phosphonate;
bis(4-(2-methyl-2-ethyl-1,3-dioxacyclopentyl) methyl) cyclohexane phosphonate;
bis(5-(2,5-dimethyl-2-ethyl-1,3-dioxacyclohexyl) methyl) 5-(2,5-dimethyl-2-ethyl-1,3-dioxacyclohexyl) methane phosphonate;
bis(5-(2,5-dimethyl-2-ethyl-1,3-dioxacyclohexyl) methyl) ethane phosphonate;
methyl-5-(2,5-dimethyl-2-ethyl-1,3-dioxacyclohexyl) methane phosphonate;
bis(5-(2,5-dimethyl-2-ethyl-1,3-dioxacyclohexyl) methyl) ethane phosphonate;
methyl-5-(2,5-dimethyl-2-ethyl-1,3-dioxacyclohexyl) methane phosphonate;
bis(5-(2,5-dimethyl-2-ethyl-1,3-dioxacyclohexyl) methyl) dodecane phosphonate;
bis(5-(2,5-dimethyl-2-ethyl-1,3-dioxacyclohexyl) methyl) propene phosphonate;
bis(5-(2,5-dimethyl-2-ethyl-1,3-dioxacyclohexyl) methyl) cyclopentane phosphonate;
butyl-(5-(2,2,5-trimethyl-1,3-dioxacyclohexyl) methyl) butane phosphonate;
bis(5-(2,2,5-trimethyl-1,3-dioxacyclohexyl) methyl) butane phosphonate;
bis(5-(2,2,5-trimethyl-1,3-dioxacyclohexyl) methyl) propane phosphonate;
bis(4-(2,2-dimethyl-1,3-dioxacyclopentyl) methyl 4-(2,2-dimethyl-1,3-dioxacyclopentyl) methane phosphonate

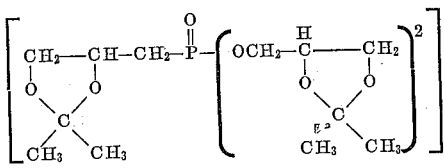

bis(4-(2,2-dimethyl-1,3-dioxacyclopentyl) methyl) methane phosphonate;
bis(4-(2,2-dimethyl-1,3-dioxacyclopentyl) methyl) octadecane phosphonate;
bis(4-(2,2-dimethyl-1,3-dioxacyclopentyl) methyl) isobutane phosphonate;
bis(4-(1,3-dioxacyclopentyl) methyl) ethane phosphonate;
bis(4-(1,3-dioxacyclopentyl) methyl) 4-(1,3-dioxacyclopentyl) methane phosphonate;
octadecyl (4-(1,3-dioxacyclopentyl) methyl) octadecane phosphonate;
bis(4-(2-methyl-1,3-dioxacyclopentyl) methyl) 4-(2-methyl-1,3-dioxacyclopentyl) methane phosphonate;
bis(4-(2-methyl-1,3-dioxacyclopentyl) methyl) ethane phosphonate;
bis(4-(2-ethyl-1,3-dioxacyclopentyl) methyl) 4(2-ethyl-1,3-dioxacyclopentyl) methane phosphonate;
bis(4-(2-ethyl-1,3-dioxacyclopentyl) methyl) methane phosphonate;
oleyl 4-(2-ethyl-1,3-dioxacyclopentyl) methyl Δ⁹-octadecene phosphonate;
bis(4-(2-propyl-1,3-dioxacyclopentyl) methyl) -4(2-propyl-1,3-dioxacyclopentyl) methane phosphonate;
bis(4-(2-propyl-1,3-dioxacyclopentyl) methyl) phenylmethane phosphonate;
bis(4-(2-propyl-1,3-dioxacyclopentyl) methyl) decane phosphonate;
bis(4-(2-heptadecyl-1,3-dioxacyclopentyl) methyl) ethane phosphonate;
bis(4-(2-heptadecenyl-1,3-dioxacyclopentyl) methyl) methane phosphonate;
bis(4-(2-vinyl-1,3-dioxacyclopentyl) methyl)-4-(2-vinyl-1,3-dioxacyclopentyl) methane phosphonate;
bis (4-(2-vinyl-1,3-dioxacyclopentyl) methyl) pentane phosphonate;
bis(4-(2-phenyl-1,3-dioxacyclopentyl) methyl) dodecane phosphonate;
bis(4-(2-p-methylphenyl-1,3-dioxacyclopentyl) methyl) octane phosphonate;
bis(4-(2-o-chlorophenyl-1,3-dioxacyclopentyl) methyl) octadecane phosphonate;
bis(4-(2-m-nitrophenyl-1,3-dioxacyclopentyl) methyl) ethane phosphonate;
bis(4-(2-bromophenyl-1,3-dioxacyclopentyl) methyl) 4-(2-bromophenyl-1,3-dioxacyclopentyl) methane phosphonate;
bis(4-(2-methyl-2-propyl-1,3-dioxacyclopentyl) methyl) 4-(2-methyl-2-propyl-1,3-dioxacyclopentyl) methane phosphonate;
bis(4-(2-methyl-2-propyl-1,3-dioxacyclopentyl) methyl) decane phosphonate;
bis(4-(2,2-diethyl-1,3-dioxacyclopentyl) methyl) 4-(2,2-diethyl-1,3-dioxacyclopentyl) methane phosphonate;
amyl (4-(2,2-diethyl-1,3-dioxacyclopentyl) methyl) pentane phosphonate;
bis(4-(2-ethyl-2-propyl-1,3-dioxacyclopentyl) methyl) methane phosphonate;
bis(4-(2-ethyl-2-propyl-1,3-dioxacyclopentyl) methyl) 4-(2-ethyl-2-propyl-1,3-dioxyacyclopentyl) methyl 4-(2-ethyl-2-propyl-1,3-dioxacyclopentyl) methane phosphonate;
bis(4-(2-ethyl-2-propyl-1,3-dioxacyclopentyl) methyl) methane phosphonate;
bis(4-(2,2-dipropyl-1,3-dioxacyclopentyl) methyl) ethane phosphonate;
bis(4-(2,2-diheptadecyl-1,3-dioxacyclopentyl)methyl) 4-(2,2-diheptadecyl-1,3-dioxacyclopentyl) methane phosphonate;
bis(4-(2,2-diheptadecyl-1,3-dioxacyclopentyl) methyl) butane phosphonate;
bis(3-(1,4-dioxaspiro (5,5) decyl) methyl) 3-(1,4-dioxaspiro (5,5) decyl) methane phosphonate;
bis (3-(1,4-dioxaspiro (5,5) decyl) methyl) butane phosphonate;
bis (3-(1,4-dioxaspiro (5,5) nonyl) methyl) methane phosphonate;
bis(4-(2,2-diphenyl-1,3-dioxacyclopentyl) methyl) 4-(2,2-diphenyl-1,3-dioxacyclopentyl) methane phosphonate;
bis(4-(2,2-diphenyl-1,3 dioxacyclopentyl) methyl) octane phosphonate;
bis(4-(2-methyl-2-phenyl-1,3-dioxacyclopentyl) methyl) 4-(2-methyl-2-phenyl-1,3-dioxacyclopentyl) methane phosphonate;
bis(4-(2-methyl-2-phenyl-1,3-dioxacyclopentyl) methyl) methane phosphonate;
bis(4-(2,2-dimethyl-1,3-dioxacyclopentyl) methoxypropyl)ethane phosphonate

bis(4-(2-methyl-2-ethyl-1,3-dioxacyclopentyl) methoxy-polyethoxyethyl) methane phosphonate (when the polyethoxy radical contains 29 ethoxy groups);
bis(4-(2,2-dimethyl-1,3-dioxacyclopentyl) butyl) 4-(2,2-dimethyl-1,3-dioxacyclopentyl) butane phosphonate;
bis(4-(2,2-dimethyl-1,3-dioxacyclopentyl) butyl) decane phosphonate;
ethyl-4 (1,3-dioxacyclopentyl) butyl ethane phosphonate;
bis(4-(2-methyl-1,3-dioxacyclopentyl) butyl) methane phosphonate;
bis(4-(2-methyl-2-ethyl-1,3-dioxacyclopentyl) butyl) hexane phosphonate;
bis(4-(1,3-dioxacyclopentyl) butyl) 4-(1,3-dioxacyclopentyl) butane phosphonate;
bis(4(1,3-dioxacyclopentyl) butyl) methane phosphonate;
bis(4-(2-methyl-1,3-dioxacyclopentyl) ethane phosphonate;
bis(4-(2,2-dimethyl-1,3-dioxacyclopentyl) butyl) phenylmethane phosphonate;
bis(4-(2,2-diphenyl-1,3-dioxacyclopentyl) butyl) heptane phosphonate;
bis(4-(2,2,5-trimethyl-1,3-dioxacyclopentyl) methyl) 4-(2,2,5-trimethyl-1,3-dioxacyclopentyl) methane phosphonate;
bis(4-(2,2,5-trimethyl-1,3-dioxacyclopentyl) methyl) propane phosphonate;
bis(4-(2,2-dimethyl-5-ethyl-1,3-dioxacyclopentyl) methyl) butane phosphonate;
bis(4-(2,4,5-trimethyl-2-ethyl-1,3-dioxacyclopentyl) methyl) methane phosphonate;
bis(5-(2,5-dimethyl-1,3-dioxacyclohexyl) methyl) decane phosphonate;
bis(5-(2-methyl-2,5-diethyl-1,3-dioxacyclohexyl) methyl) butane phosphonate;
amyl-(5(2-methyl-2,5-diethyl-1,3-dioxacyclohexyl) methyl) pentane phosphonate;
bis(5-(2,2-dimethyl-5-propyl-1,3-dioxacyclohexyl) methyl) ethane phosphonate;
bis(5-(2,2-dimethyl-5-heptadecyl-1,3-dioxacyclohexyl) methyl) propene phosphonate;
bis(5(5-methyl-1,3-dioxacyclohexyl) methyl) 5-(5-methyl-1,3-dioxacyclohexyl) methane phosphonate;
bis(5-(5-methyl-1,3-dioxacyclohexyl) methyl hexadecane phosphonate;
bis(5-(5-ethyl-1-3-dioxacyclohexyl) methyl) 5-(5-ethyl-1,3-dioxacyclohexyl) methane phosphonate;
bis(5-(5-ethyl-1,3-dioxacyclohexyl) methyl dodecane phosphonate;
bis(5-(2,5-dimethyl-1,3-dioxacyclohexyl) methyl) 5-(2,5-dimethyl-1,3-dioxacyclohexyl) methane phosphonate;
bis(5-(2,5-dimethyl-1,3-dioxacyclohexyl) methyl) ethane phosphonate;
bis(5-(2-methyl-5-ethyl-1,3-dioxacyclohexyl) methyl) 5-(2-methyl-5-ethyl-1,3-dioxacyclohexyl) methane phosphonate;
bis(5-(2-methyl-5-ethyl-1,3-dioxacyclohexyl) methyl) ethane phosphonate;
bis(5-(2-isobutyl-5-ethyl-1,3-dioxacyclohexyl) methyl) methane phosphonate;
bis(5-(2-phenyl-5-ethyl-1,3-dioxacyclohexyl) methyl) propanephosphonate;
methyl 5-(2,2-dimethyl-5-ethyl-1,3-dioxacyclohexyl) methyl methane phosphonate;
bis(5-(2,2,5-trimethyl-1,3-dioxacyclohexyl) methyl) 5-(2,2,5-trimethyl-1,3-dioxacyclohexyl) methane phosphonate;
bis(5-(2,2,5-trimethyl-1,3-dioxacyclohexyl) methyl) propane phosphonate;
bis(5-(2-methyl-2-phenyl-5-ethyl-1,3-dioxacyclohexyl) methane phosphonate;
bis(5-(2,5-dimethyl-2-phenyl-1,3-dioxacyclohexyl) methyl) ethane phosphonate;
bis(5-(2,2-diethyl-5-methyl-1,3-dioxacyclohexyl) methyl) 5-(2,2-diethyl-5-methyl-1,3-dioxacyclohexyl) methane phosphonate;
bis(5-(2,2-diethyl-5-methyl-1,3-dioxacyclohexyl) methyl) octadecane phosphonate;
bis(3-(3-methyl-1,5 dioxaspiro (6,6) undecyl) methyl) 3-(methyl-1,5-dioxaspiro (6,6) undecyl) methane phosphonate;
bis(3-(3-methyl-1,5-dioxaspiro (6,6) undecyl) methyl) pentane phosphonate;
bis(3-(3-ethyl-1,5-dioxaspiro (6,6) undecyl) methyl) 3-(3-ethyl-1,5-dioxaspiro (6,6) undecyl) methane phosphonate;
bis(3-(3-ethyl-1,5-dioxaspiro (6,6)undecyl) methyl) butane phosphonate;
bis(5-(2-cyclohexyl-5-methyl-1,3-dioxacyclohexyl) methyl) ethane phosphonate;
bis(5-(2,2-diamyl-5-ethyl-1,3-dioxacyclohexyl) methyl) methane phosphonate;
bis(5-(2,2-dimethyl-5-phenyl-1,3-dioxacyclohexyl) methyl) methane phosphonate.

Illustrative examples of starting phosphites (which can be prepared in the manner set forth in the parent application) useful for preparing the phosphonates of Formula II are phosphites having the formula $$R_{14}O-P\begin{matrix}O-CH_2\\3\\O-CH_2\end{matrix}\begin{matrix}1\\2\\4\end{matrix}\begin{matrix}6\\5C\\\end{matrix}\begin{matrix}CH_2O\\\\CH_2O\end{matrix}\begin{matrix}8\\9C\\10\end{matrix}\begin{matrix}R_1\\\\R_2\end{matrix}$$

where $R_{14}$ is aralkyl, alkyl, alkenyl, aryl, haloaryl or nitroaryl and $R_1$ and $R_2$ are as defined above. While these compounds are called herein 1,3,8,10-tetraoxa-2-phospha-spiro (5,5) undecanes, they can also be named as 2,4,8,10-tetroxa-3-phospha-spiro (5,5) undecanes. Examples of such phosphites include 2-(phenoxy)-9-methyl-9-ethyl-1,3,8,10-tetraoxa-2-phospha-spiro (5,5) undecane;
2-(methoxy)-9-methyl-9-ethyl-1,3,8,10-tetraoxa-2-phospha-spiro (5,5) undecane;
2-(octadecoxy)-9-methyl-9-ethyl-1,3,8,10-tetraoxa-2-phospha-spiro (5,5) undecane;
2-(allyloxy)-9-methyl-9-ethyl-1,3,8,10-tetraoxa-2-phospha-spira (5,5) undecane;
2-(oleyloxy)-9-methyl-9-ethyl-1,3,8,10-tetraoxa-2-phospha-spiro (5,5) undecane;
2-(benzyloxy)-9-methyl-9-ethyl-1,3,8,10-tetraoxa-2-phospha-spiro (5,5) undecane;
2-(p-dodecylbenzyloxy)-9-methyl-9-ethyl-1,3,8,10-tetraoxa-2-phospha-spiro (5,5) undecane;
2-(decoxy)-9-methyl-9-ethyl-1,3,8,10-tetraoxa-2-phospa-spiro (5,5) undecane;
2-(cyclohexoxy)-9-methyl-9-ethyl-1,3,8,10-tetraoxa-2-phospha-spiro (5,5) undecane;
2-(butoxy)-9,9-dimethyl-1,3,8,10-tetraoxa-2-phospha-spiro (5,5) undecane;
2-(methoxy)-9,9-dimethyl-1,3,8,10-tetraoxa-2-phospha-spiro (5,5) undecane;
2-(amyloxy)-1,3,8,10-tetraoxa-2-phospha-spiro (5,5) undecane;
2-(octadecoxy)-1,3,8,10-tetraoxa-2-phospha-spiro (5,5) undecane;
2-(ethoxy)-9-methyl-1,3,8,10-tetraoxa-2-phospha-spiro (5,5) undecane;
2-(oleyloxy)-9-ethyl-1,3,8,10-tetraoxa-2-phospha-spiro (5,5) undecane;
2-(decoxy)-9-propyl-1,3,8,10-tetraoxa-2-phospha-spiro (5,5) undecane;
2-(isopropoxy)-9-isopropyl-1,3,8,10-tetraoxa-2-phospha-spiro (5,5) undecane;
2-(methoxy)-9-heptadecyl-1,3,8,10-tetraoxa-2-phospha-spiro-(5,5) undecane;
2-(ethoxy)-9-heptadecyl-1,3,8,10-tetraoxa-2-phospha-spiro (5,5) undecane;
2-(dodecoxy)-9-vinyl-1,3,8,10-tetraoxa-2-phospha-spiro-(5,5) undecane;
2-(octoxy)-9-phenyl-1,3,8,10-tetraoxa-2-phospha-spiro (5,5) undecane;

2-(hexadecoxy)-9-p-methylphenyl-1,3,8,10-tetraoxa-2-phospha-spiro (5,5) undecane;
2-(octadecoxy)-9-o-chlorophenyl-1,3,8,10-tetraoxa-2-phospha-spiro (5,5) undecane;
2-(ethoxy)-9-m-nitrophenyl-1,3,8,10-tetraoxa-2-phospha-spiro (5,5) undecane;
2-(decoxy)-9-methyl-9-propyl-1,3,8,10-tetraoxa-2-phospha-spiro (5,5) undecane;
2-(pentoxy)-9,9,-diethyl-1,3,8,10-tetraoxa-2-phospha-spiro (5,5) undecane;
2-(hexoxy)-9-methyl-9-butyl-1,3,8,10-tetraoxa-2-phospha-spiro (5,5) undecane;
2-(methoxy)-9-ethyl-9-propyl-1,3,8,10-tetraoxa-2-phospha-spiro (5,5) undecane;
2-(ethoxy)-9-methyl-9-t-butyl-1,3,8,10-tetraoxa-2-phospha-spiro (5,5) undecane;
2-(methoxy)-9,9-dipropyl-1,3,8,10-tetraoxa-2-phospha-spiro (5,5) undecane;
2-(dodecoxy)-9,9-diamyl-1,3,8,10-tetraoxa-2-phospha-spiro (5,5) undecane;
2-(ethoxy)-9,9-diheptadecyl-1,3,8,10-tetraoxa-2-phospha-spiro (5,5) undecane;
2-butoxy-1,3,8,10-tetraoxa-2-phospha-dispiro (5,5,9,9) hexadecane;
2-(octadecoxy)-1,3,8,10-tetraoxa-2-phospha-dispiro (5,5,9,9) pentadecane;
2-(octoxy)-9,9-disphenyl-1,3,8,10-tetraoxa-2-phospha-spiro-(5,5) undecane;
2-(methoxy)-9-methyl-9-phenyl-1,3,8,10-tetraoxa-2-phospha-spiro (5,5) undecane;
2-(propoxy)-9,9-dimethyl-1,3,8,10-tetraoxa-2-phospha-spiro (5,5) undecane;
2-(ethoxy)-9-butyl-1,3,8,10-tetraoxa-2-phospha-spiro (5,5) undecane;
2-(methoxy)-9-cyclohexyl-1,3,8,10-tetraoxa-2-phospha-spiro (5,5) undecane.

Illustrative of phosphonates of the present invention within Formula II are 2-(methyl)-9-methyl-9-ethyl-1,3,8,10-tetraoxa-2-phosphono-spiro (5,5) undecane

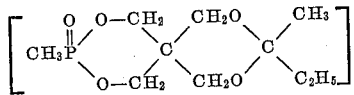

2-(2'-hydroxyethane)-9-methyl-9-ethyl-1,3,8,10-tetraoxa-2-phosphono-spiro (5,5) undecane;
2-(2'-hydroxypropane)-9,9-dimethyl-1,3,8,10-tetraoxa-2-phosphono-spiro (5,5) undecane;
2-(epoxypropane)-9,9-dimethyl-1,3,8,10-tetraoxa-2-phosphono-spiro (5,5) undecane;
2-(octadecane)-9-methyl-9-ethyl-1,3,8,10-tetraoxa-2-phosphono-spiro (5,5) undecane;
2-(propene)-9-methyl-9-ethyl-1,3,8,10-tetraoxa-2-phosphono-spiro (5,5) undecane;
2(Δ⁹-octadecene)-9-methyl-9-ethyl-1,3,8,10-tetraoxa-2-phosphono-spiro (5,5) undecane;
2-(phenylmethane)-9-methyl-9-ethyl-1,3,8,10-tetraoxa-2-phosphono-spiro (5,5) undecane;
2-(p-dodecylphenylmethane)-9-methyl-9-ethyl-1,3,8,10-tetraoxa-2-phosphono-spiro (5,5) undecane;
2-(decane)-9-methyl-9-ethyl-1,3,8,10-tetraoxa-2-phosphono-spiro (5,5) undecane;
2-(cyclohexane)-9-methyl-9-ethyl-1,3,8,10-tetraoxa-2-phosphono-spiro (5,5) undecane;
2-(butane)-9,9-dimethyl-1,3,8,10-tetraoxa-2-phosphono-spiro (5,5) undecane;
2-(methane)-9,9-dimethyl-1,3,8,10-tetraoxa-2-phosphono-spiro (5,5) undecane;
2-(pentane)-1,3,8,10-tetraoxa-2-phosphono-spiro (5,5) undecane;
2-(octadecane)-1,3,8,10-tetraoxa-2-phosphono-spiro (5,5) undecane;
2-(ethane)-9-methyl-1,3,8,10-tetraoxa-2-phosphono-spiro (5,5) undecane;
2(Δ⁹-octadecene)-9-ethyl-1,3,8,10-tetraoxa-2-phosphono-spiro (5,5) undecane;
2-(decane)-9-propyl-1,3,8,10-tetraoxa-2-phosphono-spiro (5,5) undecane;
2-(1-methylethane)-9-isopropyl-1,3,8,10-tetraoxa-2-phosphono-spiro (5,5) undecane;
2-(methane)-9-heptadecyl-1,3,8,10-tetraoxa-2-phosphono-spiro (5,5) undecane;
2-(dodecane)-9-vinyl-1,3,8,10-tetraoxa-2-phosphono-spiro (5,5) undecane;
2-(ethane)-9-heptadecenyl-1,3,8,10-tetraoxa-2-phosphono-spiro (5,5) undecane;
2-(octane)-9-phenyl-1,3,8,10-tetraoxa-2-phosphono-spiro (5,5) undecane;
2-(hexadecane)-9-p-methylphenyl-1,3,8,10-tetraoxa-2-phosphono-spiro (5,5) undecane;
2-(octadecane)-9-o-chlorophenyl-1,3,8,10-tetraoxa-2-phosphono-spiro (5,5) undecane;
2-(ethane)-9-m-nitrophenyl-1,3,8,10-tetraoxa-2-phosphono-spiro (5,5) undecane;
2-(decane)-9-methyl-9-propyl-1,3,8,10-tetraoxa-2-phosphono-spiro (5,5) undecane;
2-(pentane)-9,9-diethyl-1,3,8,10-tetraoxa-2-phosphono-phonospiro (5,5) undecane;
2-(hexane)-9-methyl-9-butyl-1,3,8,10-tetraoxa-2-phosphono-spiro (5,5) undecane;
2-(methane)-9-ethyl-9-propyl-1,3,8,10-tetraoxa-2-phosphono-spiro (5,5) undecane;
2-(ethane)-9-methyl-9-butyl-1,3,8,10-tetraoxa-2-phosphono-spiro (5,5) undecane;
2-(methane)-9,9-dipropyl-1,3,8,10-tetraoxa-2-phosphono-spiro (5,5) undecane;
2-(decane)-9,9-diamyl-1,3,8,10-tetraoxa-2-phosphono-spiro (5,5) undecane;
2-(ethane)-9,9-diheptadecyl-1,3,8,10-tetraoxa-2-phosphono-spiro (5,5) undecane;
2-(butane)-1,3,8,10-tetraoxa-2-phosphono-dispiro (5,5,9,9) hexadecane $$\begin{bmatrix} & OCH_2 & CH_2O & CH_2CH_2 \\ C_4H_9-P & \diagdown \diagup & \diagdown \diagup & \diagdown \\ & \diagup \diagdown & \diagup \diagdown & \diagup \\ & OCH_2 & CH_2O & CH_2CH_2 & CH_2 \end{bmatrix}$$

2-(octadecane)-1,3,8,10-tetraoxa-2-phosphono-dispiro (5,5,9,9) pentadecane;
2-(octane)-9,9-diphenyl-1,3,8,10-tetraoxa-2-phosphono-spiro (5,5) undecane;
2-(methane)-9-methyl-9-phenyl-1,3,8,10-tetraoxa-2-phosphono-spiro (5,5) undecane;
2-(propane)-9,9-dimethyl-1,3,8,10-tetraoxa-2-phosphono-spiro (5,5) undecane;
2-(ethane)-9-butyl-1,3,8,10-tetraoxa-2-phosphono-spiro (5,5) undecane;
2-(methyl)-9-cyclohexyl-1,3,8,10-tetraoxa-2-phosphono-spiro (5,5) undecane.

Illustrative examples of starting phosphites (which can be prepared in the manner set forth in the parent application) useful for preparing the phosphonates of Formulae III and IV are 2,2-bis(diphenoxyphosphaoxybutoxy) propane;
2,2-bis(dimethoxyphosphabutoxy) propane;
2,2-bis(didecoxyphosphaoxybutoxy) propane;
2,2-bis(phenoxydecoxyphosphaoxybutoxy) propane;
2,2-bis(di-octadecoxyphosphaoxybutoxy) propane;
2,2-bis(di-oleyloxyphosphaoxybutoxy) propane;
2,2-bis(di-cyclohexoxyphosphaoxybutoxy) propane;
2,2-bis(di-allyloxyphosphaoxybutoxy) propane;
2,2-bis(di-benzyloxyphosphaoxybutoxy) propane;
2,2-bis(di-butoxyphosphaoxybutoxy) butane;
2,2-bis(di-ethoxyphosphaoxypentoxy) butane;
2,2-bis(dimethoxyphosphaoxydecoxy) butane;
2,2-bis(dioctoxyphosphaoxydecosanoxy) butane;
2,2-bis(diethoxyphosphaoxyhexoxy) butane;
bis(di-octadecoxyphosphaoxybutoxy) methane;
bis(di-dodecyloxyphosphaoxypentoxy) methane;

bis(dimethoxyphosphaoxydecoxy) methane;
1,1-bis(diethoxyphosphaoxybutoxy) ethane;
1,1-bis(dipropoxyphosphaoxydecoxy) ethane;
1,1-bis(dioleyloxyphosphaoxybutoxy) propane;
1,1-bis(dipentoxyphosphaoxydecoxy) propane;
1,1-bis(dioleyloxyphosphaoxypentoxy) propane;
1,1-bis(didecoxyphosphaoxybutoxy) butane;
1,1-bis(dicyclohexoxyphosphaoxybutoxy)-2-methyl-propane;
1,1-bis(dimethoxyphosphaoxybutoxy) dodecane;
1,1-bis(diisopropoxyphosphaoxydecoxy) dodecane;
1,1-bis(dimethoxyphosphaoxybutoxy) octadecane;
1,1-bis(diethoxyphosphaoxydecoxy) octadecane;
bis(dibutoxyphosphaoxybutoxy) (phenyl) methane;
1,1-bis(di-dodecoxyphosphaoxybutoxy) propene-2;
1,1-bis(diethoxyphosphphaoxydecoxy) propene-2;
1,1-bis(dipropoxyphosphaoxybutoxy) butene-2;
1,1-bis(dimethoxyphosphaoxybutoxy) octadecene-9;
1,1-bis(dihexoxyphosphaoxybutoxy) (cyclohexyl) methane;
bis(dioctoxyphosphaoxybutoxy) (phenyl) methane;
bis(dimethoxyphosphaoxypentoxy) (p-methylphenyl) methane;
bis(dioctadecoxyphosphaoxybutoxy) (o-chlorophenyl) methane;
bis(dimethoxyphosphaoxybutoxy) (m-nitrophenyl) methane;
2,2-bis(didecoxyphosphaoxybutoxy) pentane;
2,2-bis(dimethoxyphosphaoxypentoxy) pentane;
3,3-bis(dimethoxyphosphaoxybutoxy)pentane;
3,3-bis(dipentoxyphosphaoxydecoxy) pentane;
2,2-bis(dimethoxyphosphaoxypentoxy) hexane;
3,3-bis(diethoxyphosphaoxybutoxy) hexane;
2,2-bis(dimethoxyphosphaoxybutoxy) 3,3-dimethyl-butane;
4,4-bis(dipropoxyphosphaoxyhexoxy) heptane;
6,6-bis(dihexadecoxyphosphaoxybutoxy) undecane;
18,18-bis(dimethoxyphosphaoxybutoxy) pentatricontane;
1,1-bis(dibutoxyphosphaoxybutoxy) cyclohexane;
1,1-bis(dimethoxyphosphaoxybutoxy) cyclopentane;
bis(dioctoxyphosphaoxybutoxy) (diphenyl) methane;
1,1-bis(dimethoxyphosphaoxyoctoxy)-1-phenylethane;
1,1-bis(dimethoxyphosphaoxybutoxy)-1-phenyl propane;
bis(dimethoxyphosphaoxyethoxyethoxy) methane;
1,1-bis(dipropoxyphosphaoxyethoxyethoxy) ethane
1,1-bis(didecoxyphosphaoxyethoxyethoxy) butane;
2,2-bis(diethoxyphosphaoxyethoxyethoxy) propane;
2,2-bis(dimethoxyphosphaoxyethoxyethoxy) butane;
1,1-bis(dimethoxyphospha-2'-oxypropoxypropoxy) ethane;
2,2-bis(dibutoxyphospha-2'-oxypropoxypropoxy) propane;
2,2-bis(dipentoxyphospha-2'-oxypropoxypropoxy) butane;
2,2-bis(dimethoxyphosphaoxypolyethoxy) propane (where the polyethoxy group has a molecular weight of 2000);
2,2-bis(dioctoxyphosphaoxypolypropoxy) butane (where the polypropoxy group as a molecular weight of 1000);
1,1-bis(diethoxyphosphaoxybutoxybutoxy) cyclohexane;
bis(dimethoxyphosphaoxyethoxyethoxyethoxy) (phenyl) methane.

Illustrative of phosphonates of the present invention within Formulae III and IV are 2,2-bis[(methoxy)(methanephosphonobutoxy)] propane

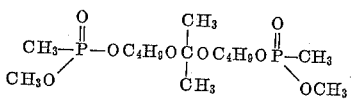

2,2-bis((methoxy) 2'-hydroxyethanephosphonobutoxy) propane; 2,2-bis((methoxy) 2'-hydroxypropanephosphonobutxoy) propane; 2,2-bis((methoxy) epoxypropanephosphonobutoxy) propane; 2,2-bis((decoxy) decanephosphonobutoxy) propane; 2,2-bis((phenoxy) decanephosphonobutoxy) propane; 2,2-bis((octadecoxy) octadecanephosphonobutoxy) propane; 2,2-bis((oleyloxy)Δ⁹-octadecenephosphonobutoxy propane; 2,2-bis((cyclohexoxy) cyclohexanephosphonobutoxy) propane; 2,2-bis-((allyloxy) propenephosphonobutoxy) propane; 2,2-bis-((benzyloxy) phenylmethanephosphonobutoxy) propane; 2,2-bis((butoxy) butanephosphonobutoxy) butane; 2,2-bis((ethoxy) ethanephosphonopentoxy) butane; 2,2-bis-((methoxy) methane phosphonodecoxy) butane; 2,2-bis-((octoxy) octanephosphonoeicosanoxy) butane; 2,2-bis-((ethoxy) ethanephosphonohexoxy) butane; bis((octadecoxy) octadecanephosphonobutoxy) methane; bis((dodecyloxy) dodecanephosphonopentoxy) methane; bis-((methoxy) methanephosphonodecoxy) methane; 1,1-bis ((ethoxy) ethanephosphonobutoxy) ethane; 1,1-bis-((propoxy) propanephosphonodecoxy) ethane; 1,1-bis-((oleyloxy)Δ⁹-octadecenephosphonobutoxy) propane; 1,1-bis((pentoxy) pentanephosphonodecoxy) propane; 1,1-bis((oleyloxy)Δ⁹-octadecenephosphonopentoxy) propane; 1,1-bis((decoxy) decanephosphonobutoxy) butane; 1,1-bis((cyclohexoxy) cyclohexanephosphono-butoxy-2-methylpropane; 1,1-bis((methoxy) methanephosphonobutoxy) dodecane; 1,1-bis((isopropoxy) isopropanephosphonodecoxy) dodecane; 1,1-bis((methoxy) methanephosphonobutoxy) octadecane; 1,1-bis((ethoxy) ethanephosphonodecoxy) octadecane; bis((butoxy) butanephosphonobutoxy) (phenyl) methane; 1,1-bis((dodecoxy) dodecanephosphonobutoxy) propene-2; 1,1-bis((ethoxy) ethanephosphonodecoxy) propene-2; 1,1-bis((propoxy) propanephosphonobutoxy) butene-2; 1,1-bis((methoxy) methanephosphonobutoxy) octadecene-9; 1,1,-bis((hexoxy) hexanephosphonobutoxy) (cyclohexyl) methane; bis((octoxy) octanephosphonobutoxy) (phenyl) methane; bis((methoxy) methanephosphonopentoxy) (p-methylphenyl) methane; bis((octadecoxy) octadecanephosphonobutoxy) (o-chlorophenyl) methane; bis((methoxy) methanephosphonobutoxy) (m-nitrophenyl) methane; 2,2-bis((decoxy) decanephosphonobutoxy) pentane; 2,2-bis-((methoxy) methanephosphonopentoxy) pentane; 3,3-bis((methoxy) methanephosphonobutoxy) pentane; 3,3-bis((pentoxy) pentanephosphonodecoxy) pentane; 2,2-bis((methoxy) methanephosphonopentoxy) hexane; 3,3-bis((ethoxy) ethanephosphonobutoxy) hexane; 2,2-bis-((methoxy) methanephosphonobutoxy) 3,3-dimethyl-butane; 4,4-bis((propoxy) propanephosphonoxhexoxy) heptane; 6,6-bis((hexadecoxy) hexadecanephosphonobutoxy) undecane; 18,18-bis((methoxy) methanephosphonobutoxy) pentatricontane; 1,1-bis((butoxy) butanephosphonobutoxy) cyclohexane; 1,1-bis((methoxy) methanephosphonobutoxy) cyclopentane; bis((octoxy) octanephosphonobutoxy) (diphenyl) methane; 1,1-bis((methoxy) methanephosphonooctoxy) - 1 - phenylethane; 1,1 - bis-((methoxy) methanephosphonobutoxy)-1-phenylpropane; bis((methoxy) methanephosphonoethoxyethoxy) methane; 1,1-bis((propoxy) propanephosphonoethoxyethoxy) ethane; 1,1-bis((decoxy) decanephosphonoethoxyethoxy) butane; 2,2-bis((ethoxy) ethanephosphonoethoxyethoxy) propane; 2,2-bis((methoxy) methanephosphonoethoxyethoxy) butane; 1,1-bis((methoxy) methanephosphonoisopropoxyisopropoxy) ethane; 2,2-bis((butoxy) butanephosphonoisopropoxyisopropoxy) propane; 2,2-bis((pentoxy) pentanephosphonoisopropoxyisopropoxy) butane; 2,2-bis((methoxy) methanephosphonopolyethoxy) propane (where the polyethoxy group has a molecular weight of 2,000); 2,2-bis((octoxy) octanephosphonopolypropoxy) butane (where the polypropoxy group has a molecular weight of 1000); 1,1-bis((ethoxy) ethanephosphonobutoxybutoxy) cyclohexane; bis((methoxy) methanephosphonoethoxyethoxyethoxy) (phenyl) methane.

Illustrative examples of starting phosphites (which can be prepared in the manner set forth in the parent application) useful for preparing the phosphonates of the Formula V are 5,6-monophenyl phosphite ester of 1,3,2,4- diisopropylidene sorbitol; 5,6-mono methyl phosphate ester of 1,3,2,4-diisopropylidene sorbitol; 5,6-mono benzyl phosphite ester of 1,3,2,4-diisopropylidene sorbitol; 5,6-monodecyl phosphite ester of 1,3,2,4-diisopropylidene sorbitol; 5,6-mono octadecyl phosphite ester of 1,3,2,4-diisopropylidene sorbitol; 5,6-mono oleyl phosphite ester of 1,3,2,4-diisopropylidene sorbitol; 5,6-mono cyclohexyl phosphite ester of 1,3,2,4-diisopropylidene sorbitol; 5,6-mono butyl phosphite ester of 1,3,2,4-diethylidene sorbitol; 5,6-mono ethyl phosphite ester of 1,3,2,4-dibenzylidene sorbitol; 3,4 mono-allyl phosphite ester of 1,2,5,6-diisopropylidene mannitol; 3,4-mono hexadecyl phosphite ester of 1,2,5,6-diisopropylidene mannitol; 5,6-mono decyl phosphite ester of 1,3,2,4-dicyclohexlyidene sorbitol; 5,6-mono methyl phosphite ester of 1,3,2,4-dimethylene sorbitol; 5,6-mono methyl phosphite ester of 1,3,2,4-di isobutylidene sorbitol; 3,4-mono amyl phosphite ester of 1,2,5,6-di benzylidene mannitol; 3,4-mono decyl phosphite ester of 1,2,5,6-di ethylidene mannitol; 5,6-mono cyclohexyl phosphite ester of 1,3,2,4-di n-butylidene sorbitol.

Illustrative of phosphonates of the present invention within Formula V are 5,6-methonephosphonate ester of 1,3,2,4-diisopropylidene sorbitol

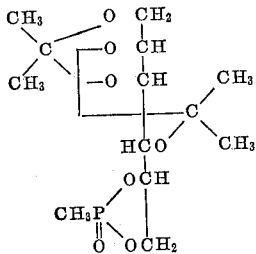

5,5,2'-hydroxyethanephosphonate ester of 1,3,2,4-diisopropylidene sorbitol;
4,5,2'-hydroxypropanephosphonate ester of 1,3,2,4-diisopropylidene sorbitol;
5,6-epoxypropane-phosphonate ester of 1,3,2,4-diisopropylidene sorbitol;
5,6-phenylmethanephosphonate ester of 1,3,2,4-diisopropylidene sorbitol;
5,6-decanephosphonate ester of 1,3,2,4-diisopropylidene sorbitol;
5,6-octadecanephosphonate ester of 1,3,2,4-diisopropylidene sorbitol;
5,6-$\Delta^9$-octadecenephosphonate ester of 1,3,2,4-diisopropylidene sorbitol;
5,6-cyclohexanephosphonate ester of 1,3,2,4-diisopropylidene sorbitol;
5,6-butanephosphonate ester of 1,3,2,4-diethylidene sorbitol;
5,6-ethanephosphonate ester of 1,3,2,4-dibenzylidene sorbitol;
3,4-propenephosphonate ester of 1,2,5,6-diisopropylidene mannitol;
3,4-hexadecanephosphonate ester of 1,2,5,6-diisopropylidene mannitol;
5,6-decanephosphonate ester of 1,3,2,4-dicyclohexylidene sorbitol;
5,6-methanephosphonate ester of 1,3,2,4-di-methylene sorbitol;
5,6-methanephosphonate ester of 1,3,2,4-di-isobutylidene sorbitol;
3,4-pentanephosphonate ester of 1,2,5,6-di benzylidene mannitol;
3,4-decane phosphonate ester of 1,2,5,6-diethylidene mannitol;
1,5,6-cyclohexanephosphonate ester of 1,3,2,4-di n-butylidene sorbitol.

Illustrative of phosphonates of the present invention within Formula VI are phenyl 2,3-dihydroxypropyl methanephosphonate

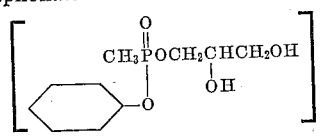

bis(2,3-dihydroxypropyl) methane phosphonate;
bis(2,3-dihydroxypropyl) 2-hydroxyethanephosphonate;
bis(2,3-dihydroxypropyl) 2-hydroxypropanephosphonate;
methyl 2,3-dihydroxypropyl methanephosphonate;
bis(2,3-dihydroxypropyl) ethanephosphonate;
bis(2,3-dihydroxypropyl) 2,3-dihydroxypropanephosphonate;
bis(2,3-dihydroxypropyl) decanephosphonate;
bis(2,3-dihydroxypropyl) octadecanephosphonate;
octadecyl 2,3-dihydroxypropyl octadecanephosphonate;
bis(2,3-dihydroxypropyl) $\Delta^9$-octadecanephosphonate;
bis(2,3-dihydroxypropyl) phenylmethanephosphonate;
bis(2,3-dihydroxypropyl) p-dodecylphenylmethanephosphonate;
bis(2,3-dihydroxypropyl) cyclohexanephosphonate;
bis(3-methyl-2,4-dihydroxybutyl) 3-methyl 2,4-dihydroxybutanephosphonate

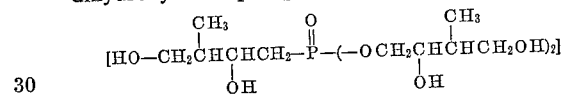

bis(3-methyl-2,4-dihydroxybutyl) ethanephosphonate;
methyl 3-methyl-2,4-dihydroxybutyl methylphosphonate

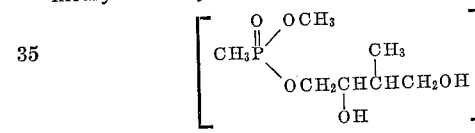

bis(3-methyl-2,4-dihydroxybutyl) dodecanephosphonate;
bis(3-methyl-2,4-dihydroxybutyl) propenephosphonate;
bis(3-methyl-2,4-dihydroxybutyl) cyclopentanephosphonate;
butyl 3-methyl-2,4-dihydroxybutyl butanephosphonate;
bis(3-methyl-2,4-dihydroxybutyl) butanephosphonate;
bis(3-methyl-2,4-dihydroxybutyl) propanephosphonate;
bis(2,3-dihydroxypropyl) isobutanephosphonate;

$$[CH_3CHCH_2\overset{O}{\underset{|}{P}}(OCH_2CHOHCH_2OH)_2]$$
$$\phantom{[CH_3CH}CH_3$$

oleyl 2,3-dihydroxypropane-$\Delta^9$-octadecenephosphonate;
bis(2,3-dihydroxypropyl) pentanephosphonate;
bis(2,3-dihydroxypropyl) dodecanephosphonate;
bis(2,3-dihydroxypropyl) octanephosphonate;
amyl 2,3-dihydroxypropyl pentanephosphonate;
bis(2,3-dihydroxypropyl) butanephosphonate;
bis(2,3-dihydroxypropoxypropyl) ethanephosphonate $$[C_2H_5\overset{O}{P}-(O\overset{CH_3}{\underset{|}{C}}HCH_2OCH_2CHOHCH_2OH)_2]$$

bis(2,3-dihydroxypropoxy polyethoxy methanephosphonate having 30 ethoxy groups $$[CH_3\overset{O}{P}-(O(CH_2CH_2O)_{30}CH_2CHOHCH_2OH)_2]$$

bis(5,6 - dihydroxyhexyl) 5,6 - dihydroxyhexanephosphonate $$[HOCH_2CHOHC_4H_9\overset{O}{P}(OC_4H_9CHOHCH_2OH)_2]$$

bis(5,6-dihydroxyhexyl) decanephosphonate;
ethyl 5,6-dihydroxyhexyl ethanephosphonate;
bis(5,6-dihydroxyhexyl) methanephosphonate;
bis(5,6-dihydroxyhexyl) hexanephosphonate;
bis(5,6-dihydroxyhexyl) phenylmethanephosphonate;

bis(5,6-dihydroxyhexyl) heptanephosphonate;
bis(2,3-dihydroxybutyl) 2,3-dihydroxybutanephosphonate;
bis(2,3-dihydroxybutyl) propanephosphonate;
bis(2,3-dihydroxyamyl) butanephosphonate;
bis(2-methyl-2,3-dihydroxybutyl) methanephosphonate;
bis(2,2-di(hydroxymethyl) propyl decylphosphonate

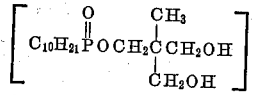

bis 2,2-di(hydroxymethyl) butyl butanephosphonate;
amyl 2,2-di(hydroxymethyl) butylpentanephosphonate

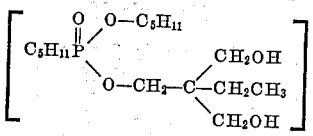

bis(2,2-di(hydroxymethyl) amyl)ethanephosphonate;
bis(2,2-di(hydroxymethyl) monadecyl) propenephosphonate;
bis(2,2-di(hydroxymethyl) propyl) 2,2-di(hydroxymethyl) propanephosphonate;
bis 2,2-di(hydroxymethyl) propyl) hexadecanephosphonate;
bis(2,2-di(hydroxymethyl) butyl) 2,2-di(hydroxymethyl) butanephosphonate;
bis(2,2-di(hydroxymethyl) butyl) dodecanephosphonate;
bis(2,2-di(hydroxymethyl) butyl) ethanephosphonate;
bis(2,2-di(hydroxymethyl) butyl) propanephosphonate;
methyl 2,2-di(hydroxymethyl) butylmethanephosphonate;
bis(2,2-di(hydroxymethyl) propyl) ethanephosphonate;
bis(2,2-di(hydroxymethyl) propyl) octadecanephosphonate;
bis(2,2-di(hydroxymethyl) propyl) pentanephosphonate;
bis(2,2-di(hydroxymethyl) butyl) butanephosphonate;
bis(2,2-di(hydroxymethyl) propyl) methanephosphonate;
bis(2-hydroxymethyl-2-phenyl-3-hydroxy propyl) methanephosphonate.

Illustrative of phosphonates of the present invention within Formula VII are 5,5-dihydroxymethyl-1,3-dioxa-2-methanephosphonocyclohexane

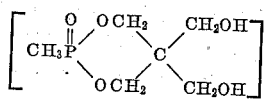

5,5-di(hydroxymethyl)-1,3-dioxa-2-(2'-hydroxyethane) phosphonocyclohexane;
5,5-di(hydroxymethyl)-1,3-dioxa-2-(2'-hydroxypropane) phosphonocyclohexane;
5,5-di(hydroxymethyl)-1,3-dioxa-2-octadecanephosphonocyclohexane;
5,5-di(hydroxymethyl)-1,3-dioxa-2-propenephosphonocyclohexane

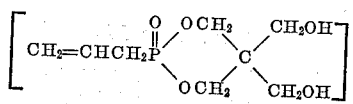

5,5-di(hydroxymethyl) 1,3-dioxa-2-Δ⁹-octadecenephosphonocyclohexane;
5,5-di(hydroxymethyl)-1,3-dioxa-2-phenylmethanephosphonocyclohexane;
5,5-di(hydroxymethyl)-1,3-dioxa-2-p-dodecylphenylthanephosphonocyclohexane;
5,5-di(hydroxymethyl)-1,3-dioxa-2-decanephosphonocyclohexane;
5,5-di(hydroxymethyl)-1,3-dioxa-2-cyclohexanephosphonocyclohexane;
5,5-di(hydroxymethyl)-1,3-dioxa-2-butanephosphonocyclohexane;
5,5-di(hydroxymethyl)-1,3-dioxa-2-pentanephosphonocyclohexane;
5,5-di(hydroxymethyl)-1,3-dioxa-2-ethanephosphonocyclohexane;
5,5-di(hydroxymethyl)-1,3-dioxa-2-(1'-methyl) ethanephosphonocyclohexane;
5,5-di(hydroxymethyl)-1,3-dioxa-2-dodecanephosphonocyclohexane;
5,5-di(hydroxymethyl)-1,3-dioxa-2-octanephosphonocyclohexane;
5,5-di(hydroxymethyl)-1,3-dioxa-2-hexadecanephosphonocyclohexane;
5,5-di(hydroxymethyl)-1,3-dioxa-2-hexanephosphonocyclohexane;
5,5-di(hydroxymethyl)-1,3-dioxa-2-propanephosphonocyclohexane.

Illustrative of phosphonates of the present invention within Formula VIII are 5,6-methanephosphonate ester of sorbitol;
5,6-(2'-hydroxy) ethane phosphonate ester of sorbitol;
5,6-(2'-hydroxy) propanephosphonate ester of sorbitol;
5,6-phenylmethanephosphonate ester of sorbitol;
5,6-decanephosphonate ester of sorbitol;
5,6-octadecanephosphonate ester of sorbitol;
5,6-Δ⁹-octadecenephosphonate ester of sorbitol;
5,6-butanephosphonate ester of sorbitol;
5,6-ethanephosphonate ester of sorbitol;
3,4-propenephosphonate ester of mannitol;
3,4-hexadecanephosphonate ester of mannitol;
3,4-pentanephosphonate ester of mannitol;
3,4-decanephosphonate ester of mannitol.

Unless otherwise indicated, all parts and percentages are by weight.

*Example 1*

8 moles of acetone, 2 moles of trimethylolethane, 400 grams of pentane and 6 grams of p-toluenesulfonic acid were mixed and heated at reflux and the water of reaction was collected in a Dean and Stark trap. Heating was continued until the theoretical amount of water had been removed. The product was 2,2,5-trimethyl-5-methylol-1,3-dioxacyclohexane, a colorless viscous liquid, yield 283 grams (88.2% of theory) B.P. 84–88° C./0.8 mm., showing significant infrared absorptions at 2.78 (OH) and 9.22 (cyclic ether) microns.

*Example 2*

8 moles of methyl ethyl ketone, 4 moles of glycerine, 400 grams of hexane and 10 grams of p-toluenesulfonic acid were refluxed in the manner described in Example 1. From the reaction mixture was isolated 2-methyl-2-ethyl-5-methylol-1,3-dioxacyclopentane, a colorless liquid boiling at 63–67° C./0.3 mm., yield 485 grams (82.8% of theory), hydroxy value 382.7 (theory 383) having the formula

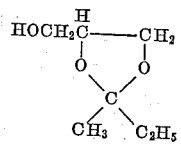

The product is also called 2-methyl-2-ethyl-4-methylol-1,3-dioxacyclopentane.

*Example 3*

2.1 moles of cyclohexanone, 2.0 moles of glycerine, 100 grams of toluene and 2 grams of 50% aqueous sulfuric acid were refluxed for 3 hours into a Dean and Stark trap during which time the theoretical amount of water was collected. The reaction mixture was neutralized with 2 grams of sodium carbonate, filtered and the solvent removed in vacuo. The product which was recovered by distillation was 2,2 - pentamethylene-5-hydroxymethyl-1,3-dioxacyclopentane, a colorless liquid, B.P. 98–103° C./0.6 mm., $n_D^{20}$ 1.4780, showing strong infrared absorption at 2.78 (OH) and 9.05 (ether) microns; yield 305 grams (88.5% of theory).

Example 4

6.0 moles of methyl ethyl ketone, 3.0 moles of 1,2,6-hexanetriol, 400 grams of hexane and 10 grams of p-toluenesulfonic acid were refluxed for 8 hours while collecting the water formed by the reaction in a Dean and Stark trap. From the reaction mixture was isolated 490 grams (86.7% yield) of 2-methyl-2-ethyl-5(4-hydroxybutyl) 1,3 - dioxacyclopentane, a colorless liquid B.P. 106–110° C./0.6 mm., hydroxyl value 294.5 (theory 298).

Example 5

1.0 mole of trimethyl phosphite and 2.0 moles of 2-methyl - 2 - ethyl - 5(4 - hydroxybutyl) - 1,3 - dioxacyclopentane. The ketal of Example 4 were heated with 1 gram of sodium methoxide for 1 hour at 80 to 140° C. (pot temperature) while allowing methanol to distill from the reaction mixture through a packed column. After vacuum stripping, the product was filtered to give 430 grams (98.5% of theory) of methyl bis[(4-(2-methyl-2-ethyl-1,3-dioxacyclopentyl)butyl] phosphite a colorless liquid having the formula

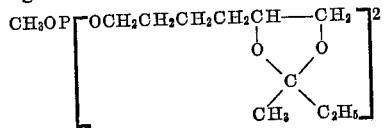

Example 6

The procedure of Example 5 was repeated but utilizing 2.0 moles of 2,2-pentamethylene-5-hydroxymethyl-1,3-dioxacyclopentane (the ketal of Example 3) in place of the ketal of Example 4. The product was methyl bis-(3(1,4 - dioxaspiro - (5,5) - decyl)methyl) phosphite, a colorless viscous liquid obtained in a yield of 96.3% and having the formula

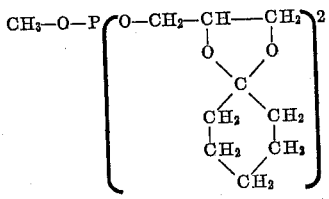

Example 7

The procedure of Example 5 was repeated but utilizing 2.0 moles of 2,2,5-trimethyl - 5 - methylol-1,3-dioxacyclohexane (the ketal of Example 1) in place of the ketal of Example 4. The product was methyl bis - (5-(2,2,5-trimethyl-1,3-dioxacyclohexyl)methyl) phosphite.

Example 8

The procedure of Example 5 was repeated but utilizing 2.0 moles of 2-methyl-2-ethyl-5-methylol-1,3-dioxacyclopentane (the ketal of Example 2) in place of the ketal of Example 4 and using 1 mole of trioctadecyl phosphite in place of the trimethyl phosphite. The product was octadecyl bis(4-(2-methyl-2-ethyl-1,3-dioxacyclopentyl) methyl) phosphite.

Example 9

200 grams of the methyl bis(4-(2-methyl-2-ethyl-1,3-dioxacyclopentyl)butyl) phosphite (the ketal phosphite prepared in Example 5) was heated for 7 hours at 140–150° C. with one gram of ethyl iodide as a catalyst. The conversion to phosphonate was followed by periodic sampling and titration with 0.1 N iodine in benzene during the heating period. All of the phosphite was converted after the 7 hours of heating. After vacuum stripping, there was obtained as the product in a yield of 99.4% bis(4-(2-methyl-2-ethyl-1,3-dioxacyclopentyl)-butyl) methanephosphonate as a colorless liquid having the structure:

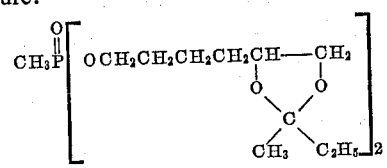

There was a slight impurity of bis(4-(2-methyl-2-ethyl-1,3-dioxacyclopentyl)butyl) ethane-phosphonate. In another run by using methyl iodide rather than ethyl iodide as the catalyst the impurity was completely eliminated.

Example 10

The procedure of Example 9 was repeated replacing the ketal phosphite of Example 5 with 200 grams of methyl bis(3(1,4 - dioxaspiro (5,5) decyl)methyl) phosphite (the ketal phosphite of Example 6) and using 1 gram of ethyl iodide as a catalyst. The product was bis(3(1,4-dioxaspiro (5,5) decyl) methyl methane phosphonate, a viscous slightly yellow liquid having the formula

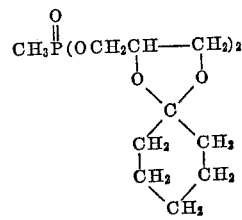

Example 11

The procedure of Example 10 was repeated replacing the ketal phosphite of Example 6 with 200 grams of methyl bis(5(2,5 - dimethyl-2-ethyl-1,3-dioxacyclohexyl) methyl) phosphite and using 1 gram of methyl iodide as the catalyst. The product was bis(5(2,5 - dimethyl-2-ethyl-1,3-dioxacyclohexyl)-methyl) methanephosphonate.

Example 12

The procedure of Example 9 was repeated replacing the ketal phosphite of Example 5 with 200 grams of octadecyl bis(4 - (2-methyl-2-ethyl-1,3-dioxacyclopentyl) methyl) phosphite and using 1 gram of octadecyl bromide as the catalyst. The product was bis(4-(2-methyl-2-ethyl - 1,3 - dioxacyclopentyl) methyl) octadecanephosphonate.

Example 13

The procedure of Example 9 was repeated replacing the ketal phosphite of Example 5 by 2-methoxy-9-methyl-9-ethyl-1,3,8,10-tetraoxa-2-phosphaspiro (5,5) undecane and using 1 gram of methyl iodide as the catalyst. The product was 2-(methane)-9-methyl-9-ethyl-1,3,8,10-tetraoxa-2-phosphonospiro (5,5) undecane.

Example 14

The procedure of Example 9 was repeated replacing the ketal phosphite of Example 5 by 200 grams of 2,2-bis-(dimethoxyphosphabutoxy) propane and using 1 gram of methyl iodide as the catalyst. The product was 2,2-bis((methoxy) methanephosphonobutoxy) propane.

Example 15

The procedure of Example 9 was repeated replacing the ketal phosphite of Example 5 by 200 grams of the 5,6-monodecyl phosphite ester of 1,3,2,4-diisopropylidene sorbitol and using 1 gram of decyl iodide as the catalyst. The product was 5,6-decanephosphonate ester of 1,3,2,4-diisopropylidene sorbitol.

Example 16

100 grams of bis(4-(2-methyl-2-ethyl-1,3-dioxacyclopentyl)butyl) methanephosphonate (the ketal phosphonate of Example 9) was heating for 30 minutes at 80° C. with an equal weight of water. The pH of the mixture was between 2 and 4 due to a small residual acidity of the ketal phosphonate. By the end of the heating period, the reaction mixture was homogeneous due to hydrolysis of the ketal groups. There was no change in acidity indicating no hydrolysis of the phosphonate to phosphonic acid. The reaction mixture was cooled, neutralized to a pH of 7 with sodium hydroxide and the water was removed in vacuo. The filtered product was bis(5,6-dihydroxyhexyl) methanephosphonate, a colorless viscous liquid obtained in quantitative yield, and having a hydroxyl value of 694 (theory 683) and having the formula

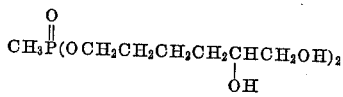

Example 17

The procedure of Example 16 was repeated replacing the ketal phosphonate of Example 9 by 100 grams of bis(3(1,4-dioxaspiro (5,5) decyl) methyl) methanephosphonate (the ketal phosphonate of Example 10). The product was bis(2,3-dihydroxypropyl) methanephosphonate, a colorless syrup obtained in a yield of 98.7% and having the formula

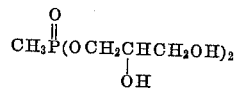

Example 18

The procedure of Example 16 was repeated replacing the ketal phosphonate of Example 9 by 100 grams of 2-(methane)-9-methyl-9-ethyl - 1,3,8,10 - tetraoxa-2-phosphono spiro (5,5) undecane. The product was 5,5-dihydroxymethyl - 1,3 - dioxa-2-methanephosphonocyclohexane.

Example 19

The procedure of Example 16 was repeated replacing the ketal phosphonate of Example 9 by 100 grams of 5,6-decanephosphonate ester of 1,3,2,4-diisopropylidene sorbitol. The product was the 5,6-decanephosphonate ester of sorbitol.

What is claimed is:
1. A phosphonate having the formula

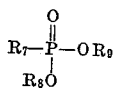

where
$R_7$ is selected from the group consisting of alkyl, alkenyl, benzyl, alkylbenzyl, epoxy lower alkyl, hydroxy lower alkyl, and $R_9$;
$R_8$ is selected from the group consisting of alkyl, alkenyl, phenyl, benzyl, alkybenzyl, alkyl phenyl, naphthyl, halophenyl and $R_9$;
$R_9$ is

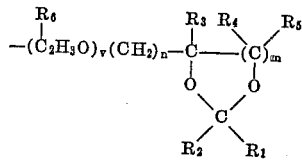

$R_1$ and $R_2$ are selected from the group consisting of hydrogen, alkyl, alkenyl, phenyl, alkyl phenyl, halophenyl and nitrophenyl, individually, and

together form a cycloalkyl ring of 5 to 6 carbon atoms;
$R_3$ is selected from the group consisting of hydrogen, alkyl, phenyl and alkyl phenyl;
$R_4$ and $R_5$ are selected from the group consisting of hydrogen and alkyl;
$R_6$ is selected from the group consisting of hydrogen and lower alkyl;
$v$ is selected from the group consisting of zero and an integer;
$n$ is an integer selected from the group consisting of 1 and 4;
$m$ is an integer between 1 and 2 inclusive.

2. Bis(4-(1,3-dioxacyclopentyl)methyl)alkanephosphonate having up to 2 alkyl groups attached to the number 2 carbon atom of the dioxacyclopentane ring.

3. Bis(3 - (1,4 - dioxaspiro(5,5)decyl)methyl)alkanephosphonate.

4. Bis(4-(1,3 - dioxacyclopentyl)butyl)alkanephosphonate having up to 2 alkyl groups attached to the number 2 carbon atom of the dioxacyclopentane ring.

5. Bis(3 - (1,4-dioxaspiro(5,5)decyl)butyl)alkanephosphonate.

6. Bis(5-(5-lower alkyl-1,3-dioxacyclohexyl)methyl)alkanephosphate having up to 2 alkyl groups attached to the number 2 carbon atom of the 1,3-dioxacyclohexane ring.

7. Bis(3-(1,5 - dioxaspiro(6,6)undecyl)butyl)alkanephosphonate.

References Cited by the Examiner
UNITED STATES PATENTS

| | | | |
|---|---|---|---|
| 2,847,421 | 8/58 | D'Addieco | 260—340.7 |
| 3,006,946 | 10/61 | Lanham | 260—461 |
| 3,033,887 | 5/62 | Wadsworth et al. | 260—461 |
| 3,050,531 | 8/62 | Epstein et al. | 260—340.7 |
| 3,053,877 | 9/62 | Birum et al. | 260—461 |
| 3,076,011 | 1/63 | Hamermesh et al. | 260—461 |
| 3,081,333 | 3/63 | Renner | 260—461 |
| 3,093,672 | 6/63 | Miller | 260—461 |

WALTER A. MODANCE, *Primary Examiner.*
NICHOLAS S. RIZZO, *Examiner.*